United States Patent
King et al.

(10) Patent No.: US 9,993,797 B2
(45) Date of Patent: Jun. 12, 2018

(54) MICROWAVE-ASSISTED CONVERSION OF CARBON DIOXIDE TO CARBON MONOXIDE

(71) Applicant: ECOKAP TECHNOLOGIES LLC, Miami, FL (US)

(72) Inventors: Paul E. King, Albany, OR (US); Ben Zion Livneh, Denver, CO (US)

(73) Assignee: ECOKAP TECHNOLOGIES LLC, Miami, FL (US)

( * ) Notice: Subject to any disclaimer, the term of this patent is extended or adjusted under 35 U.S.C. 154(b) by 0 days. days.

(21) Appl. No.: 15/403,127

(22) Filed: Jan. 10, 2017

(65) Prior Publication Data

US 2017/0203274 A1   Jul. 20, 2017

Related U.S. Application Data

(60) Provisional application No. 62/279,656, filed on Jan. 15, 2016.

(51) Int. Cl.
   *C01B 31/18*   (2006.01)
   *B01J 19/12*   (2006.01)
   (Continued)

(52) U.S. Cl.
   CPC .......... *B01J 19/126* (2013.01); *B01D 53/26* (2013.01); *B01D 53/62* (2013.01); *B01J 23/745* (2013.01);
   (Continued)

(58) Field of Classification Search
   CPC ........ B01J 19/126; B01J 21/18; B01J 23/745; B01J 2219/0801; B01J 2219/0879;
   (Continued)

(56) References Cited

U.S. PATENT DOCUMENTS

| 3,505,204 A | 4/1970 | Hoffman |
| 4,256,654 A | 3/1981 | Schlinger et al. |

(Continued)

FOREIGN PATENT DOCUMENTS

| CN | 101665721 A | * 3/2010 |
| GB | 2096635 | 10/1982 |

(Continued)

OTHER PUBLICATIONS

Fidalgo et al; "Microwave-assisted dry reforming of methane"; Intl. J. Hydrogen Energy vol. 22 p. 4337 (2008).

(Continued)

*Primary Examiner* — Richard M Rump
(74) *Attorney, Agent, or Firm* — David S. Alavi (57) ABSTRACT

A method for conversion of carbon dioxide to carbon monoxide comprises: introducing a flow of a dehumidified gaseous source of carbon dioxide into a reaction vessel; and irradiating dried, solid carbonaceous material in the reaction vessel with microwave energy. Heating of the irradiated carbonaceous material drives an endothermic reaction of carbon dioxide and carbon that produces carbon monoxide. At least a portion of heat required to maintain a temperature within the reaction vessel is supplied by the microwave energy. Carbon monoxide thus produced is allowed to flow out of the reaction vessel.

27 Claims, 1 Drawing Sheet

(51) Int. Cl.
  *B01D 53/26* (2006.01)
  *B01D 53/62* (2006.01)
  *B01J 23/745* (2006.01)
  *C01B 32/40* (2017.01)
  *B01J 21/18* (2006.01)

(52) U.S. Cl.
  CPC .......... *C01B 32/40* (2017.08); *B01D 2251/20* (2013.01); *B01D 2257/504* (2013.01); *B01D 2258/0283* (2013.01); *B01J 21/18* (2013.01); *B01J 2219/0801* (2013.01); *B01J 2219/0879* (2013.01); *B01J 2219/1206* (2013.01); *B01J 2219/1269* (2013.01); *B01J 2219/1281* (2013.01); *B01J 2219/1296* (2013.01)

(58) Field of Classification Search
  CPC ........ B01J 2219/1296; B01J 2219/1269; B01J 2219/1281; B01J 2219/1206; C01B 31/18; C01B 32/40; B01D 53/26; B01D 53/62; B01D 2257/504; B01D 2251/20; B01D 2258/0283
  See application file for complete search history.

(56) References Cited

U.S. PATENT DOCUMENTS

| | | | |
|---|---|---|---|
| 4,435,374 A | 3/1984 | Helm | |
| 5,205,912 A | 4/1993 | Murphy | |
| 5,266,175 A | 11/1993 | Murphy | |
| 5,972,175 A | 10/1999 | Tanner et al. | |
| 7,887,694 B2 | 2/2011 | Constantz et al. | |
| 8,388,706 B2 * | 3/2013 | Ugolin | B01J 8/0055 423/644 |
| 8,779,013 B2 | 7/2014 | Livneh | |
| 9,238,214 B2 | 1/2016 | Livneh | |
| 9,353,323 B2 | 5/2016 | Kyle | |
| 9,617,478 B2 | 4/2017 | Livneh | |
| 9,617,486 B2 | 4/2017 | Kyle | |
| 2003/0162846 A1 | 8/2003 | Wang et al. | |
| 2004/0031731 A1 | 2/2004 | Honeycutt et al. | |
| 2004/0209303 A1 | 10/2004 | Martin | |
| 2007/0004809 A1 | 1/2007 | Lattner et al. | |
| 2009/0205254 A1 | 8/2009 | Zhu et al. | |
| 2010/0005720 A1 | 1/2010 | Stadler et al. | |
| 2010/0219107 A1 | 9/2010 | Parsche | |
| 2011/0126461 A1 | 6/2011 | Bromberg et al. | |
| 2012/0024843 A1 | 2/2012 | Lissianski et al. | |
| 2012/0055851 A1 | 3/2012 | Kyle | |
| 2012/0311931 A1 | 12/2012 | Dooher | |
| 2013/0197288 A1 | 8/2013 | Schafer et al. | |
| 2013/0213795 A1 | 8/2013 | Strohm et al. | |
| 2013/0303637 A1 | 11/2013 | Kyle | |
| 2014/0051775 A1 | 2/2014 | Kyle | |
| 2014/0066526 A1 | 3/2014 | Kyle | |
| 2014/0163120 A1 * | 6/2014 | Kyle | C10G 2/35 518/702 |
| 2014/0346030 A1 | 11/2014 | Livneh | |
| 2015/0246337 A1 | 9/2015 | Hong et al. | |
| 2017/0129777 A1 | 5/2017 | King et al. | |
| 2017/0129778 A1 | 5/2017 | King et al. | |

FOREIGN PATENT DOCUMENTS

| | | |
|---|---|---|
| WO | WO 2008/009644 | 1/2008 |
| WO | WO 2014/038907 | 3/2014 |

OTHER PUBLICATIONS

Fidalgo et al; "Syngas Production by CO2 Reforming of CH4 under Microwave Heating . . . "; Syngas: Production, Application and Environmental Impact, Indarto and Palguandi Eds. p. 121 (2013).
Hunt et al; Microwave-Specific Enhancement of the Carbon-Carbon Dioxide (Boudouard) Reaction; J. Phys. Chem. C vol. 111 No. 5 p. 26871 (2013).
International Search Report dated Apr. 24, 2017 in counterpart App No. PCT/US2017/012888.
International Search Report dated Nov. 9, 2016 in related App No. PCT/US2016/045595.
International Search Report dated Nov. 16, 2016 in related App No. PCT/US2016/045603.
Related U.S. Appl. No. 15/228,861, filed Aug. 4, 2016 in the names of King and Livneh (available in IFW).
Related U.S. Appl. No. 15/228,904, filed Aug. 4, 2016 in the names of King and Livneh (available in IFW).
Lavoie; "Review on dry reforming of methane . . . "; Frontiers in Chemistry vol. 2 Article 81 pp. 1-17; Nov. 11, 2014.
Lahijani, Pooya et al. "Improvement of Biomass Char-CO2 Gasification Reactivity Using Microwave Irradiation and Natural Catalyst." Thermochimica Acta, Jan. 28, 2015(online), vol. 604, pp. 61-66.

* cited by examiner

MICROWAVE-ASSISTED CONVERSION OF CARBON DIOXIDE TO CARBON MONOXIDE

BENEFIT CLAIM

This application claims benefit of U.S. provisional App. No. 62/279,656 filed Jan. 15, 2016 in the names of Paul E. King and Ben Zion Livneh, said provisional application being hereby incorporated by reference as if fully set forth herein.

FIELD OF THE INVENTION

The field of the present invention relates to carbon monoxide generation. In particular, microwave-assisted conversion of carbon dioxide to carbon monoxide in the presence of elemental carbon is disclosed herein.

BACKGROUND

The subject matter of the present application may be related to subject matter disclosed in:
- U.S. Pub. No. 2003/0162846 entitled "Process and apparatus for the production of synthesis gas" published Aug. 28, 2003 in the names of Wang et al;
- U.S. Pub. No. 2004/00031731 entitled "Process for the microwave treatment of oil sands and shale oils" published Feb. 19, 2004 in the names of Honeycutt et al;
- U.S. Pub. No. 2004/0209303 entitled "Methods and compositions for directed microwave chemistry" published Oct. 21, 2004 in the name of Martin;
- U.S. Pub. No. 2007/0004809 entitled "Production of synthesis gas blends for conversion to methanol or Fischer-Tropsch liquids" published Jan. 4, 2007 in the names of Lattner et al;
- U.S. Pub. No. 2009/0205254 entitled "Method And System For Converting A Methane Gas To A Liquid Fuel" published Aug. 20, 2009 in the names of Zhu et al;
- U.S. Pub. No. 2010/0005720 entitled "Gasifier" published Jan. 14, 2010 in the names of Stadler et al;
- U.S. Pub. No. 2010/0219107 entitled "Radio frequency heating of petroleum ore by particle susceptors" published Jan. 14, 2010 in the name of Parsche;
- U.S. Pub. No. 2012/0055851 entitled "Method and apparatus for producing liquid hydrocarbon fuels from coal" published Mar. 8, 2012 in the name of Kyle;
- U.S. Pub. No. 2012/0024843 entitled "Thermal treatment of carbonaceous materials" published Feb. 2, 2012 in the names of Lissiaski et al;
- U.S. Pub. No. 2013/0197288 entitled "Process for the conversion of synthesis gas to olefins" published Aug. 1, 2013 in the names of Schafer et al;
- U.S. Pub. No. 2013/0213795 entitled "Heavy Fossil Hydrocarbon Conversion And Upgrading Using Radio-Frequency or Microwave Energy" published Aug. 22, 2013 in the names of Strohm et al;
- U.S. Pub. No. 2013/0303637 entitled "Method and apparatus for producing liquid hydrocarbon fuels from coal" published Nov. 14, 2013 in the name of Kyle;
- U.S. Pub. No. 2014/0051775 entitled "Method and apparatus for producing liquid hydrocarbon fuels" published Feb. 20, 2014 in the name of Kyle;
- U.S. Pub. No. 2014/0066526 entitled "Method and apparatus for producing liquid hydrocarbon fuels" published Mar. 6, 2014 in the name of Kyle;
- U.S. Pub. No. 2014/0163120 entitled "Method and apparatus for producing liquid hydrocarbon fuels" published Jun. 12, 2014 in the name of Kyle;
- U.S. Pub. No. 2014/0346030 entitled "Methods and apparatus for liquefaction of organic solids" published Nov. 27, 2014 in the name of Livneh;
- U.S. Pub. No. 2015/0246337 entitled "Plasma dry reforming apparatus" published Sep. 3, 2015 in the names of Hong et al;
- U.S. Pub. No. 2016/0222300 entitled "Process and apparatus for converting greenhouse gases into synthetic fuels" published Aug. 4, 2016 in the name of Livneh;
- U.S. Pub. No. 2016/0333281 entitled "Method and apparatus for producing liquid hydrocarbon fuels" published Nov. 17, 2016 in the name of Kyle;
- U.S. Pat. No. 3,505,204 entitled "Direct conversion of carbonaceous material to hydrocarbons" issued Apr. 7, 1970 to Hoffman;
- U.S. Pat. No. 4,256,654 entitled "Conversion of hydrogen and carbon monoxide into $C_1$-$C_4$ range hydrocarbons" issued Mar. 17, 1981 to Schlinger et al;
- U.S. Pat. No. 4,392,940 entitled "Coal-oil slurry preparation" issued Jul. 12, 1983 to Tao;
- U.S. Pat. No. 4,435,374 entitled "Method of producing carbon monoxide and hydrogen by gasification of solid carbonaceous material involving microwave irradiation" issued Mar. 6, 1984 to Helm;
- U.S. Pat. No. 5,205,912 entitled "Conversion of methane using pulsed microwave radiation" issued Apr. 27, 1993 to Murphy;
- U.S. Pat. No. 5,266,175 entitled "Conversion of methane, carbon dioxide and water using microwave radiation" issued Nov. 30, 1993 to Murphy;
- U.S. Pat. No. 5,972,175 entitled "Catalytic microwave conversion of gaseous hydrocarbons" issued Oct. 26, 1999 to Tanner et al;
- U.S. Pat. No. 7,887,694 entitled "Methods of sequestering $CO_2$" issued Feb. 15, 2011 to Constantz et al;
- U.S. Pat. No. 8,779,013 entitled "Process and apparatus for converting greenhouse gases into synthetic fuels" issued Jul. 15, 2014 to Livneh;
- U.S. Pat. No. 9,238,214 entitled "Process and apparatus for converting greenhouse gases into synthetic fuels" issued Jan. 19, 2016 to Livneh;
- U.S. Pat. No. 9,353,323 entitled "Method and apparatus for producing liquid hydrocarbon fuels" issued May 31, 2016 to Kyle;
- WO 2008/009644 published Jan. 24, 2008 in the names of O'Connor et al;
- Fidalgo et al; "Microwave-assisted dry reforming of methane"; Intl. J. Hydrogen Energy Vol 22 p 4337 (2008);
- Fidalgo et al; "Syngas Production by $CO_2$ Reforming of $CH_4$ under Microwave Heating—Challenges and Opportunities"; Syngas: Production, Application and Environmental Impact, Indarto and Palguandi Eds. p 121 (2013);
- Hunt et al; Microwave-Specific Enhancement of the Carbon-Carbon Dioxide (Boudouard) Reaction"; J. Phys. Chem. C Vol 111 No 5 p 26871 (2013); and
- Lavoie; "Review on dry reforming of methane, a potentially more environmentally-friendly approach to the increasing natural gas exploitation"; Frontiers in Chem. Vol 2 Article 81 (2014).

Each one of those patents, publications, and references is incorporated by reference as if fully set forth herein.

SUMMARY

A method for generating carbon monoxide comprises: (a) introducing a flow of a dehumidified gaseous source of carbon dioxide into a reaction vessel; and (b) irradiating dried, solid carbonaceous material in the reaction vessel with microwave energy. The irradiated carbonaceous material is heated, and the heating drives an endothermic reaction of the carbon dioxide and carbon that produces carbon monoxide. At least a portion of heat required to maintain a temperature within the reaction vessel is supplied by the microwave energy irradiating the carbonaceous material. The generated carbon monoxide is allowed to flow out of the reaction vessel. A solid susceptor or catalyst can be irradiated along with the carbonaceous material in the reaction vessel.

Objects and advantages pertaining to conversion of carbon dioxide to carbon monoxide may become apparent upon referring to the example embodiments illustrated in the drawings and disclosed in the following written description or appended claims.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The embodiment depicted is shown only schematically: all features may not be shown in full detail or in proper proportion, certain features or structures may be exaggerated relative to others for clarity, and the drawing should not be regarded as being to scale. The embodiment shown is only an example: it should not be construed as limiting the scope of the present disclosure or appended claims.

DETAILED DESCRIPTION OF EMBODIMENTS

The subject matter of the present application may be related to subject matter disclosed in (i) U.S. provisional App. No. 62/202,768 filed Aug. 7, 2015, (ii) U.S. provisional App. No. 62/202,770 filed Aug. 7, 2015, (iii) U.S. provisional App. No. 62/249,891 filed Nov. 2, 2015, (iv) U.S. non-provisional application Ser. No. 15/228,861 filed Aug. 4, 2016, (v) U.S. non-provisional application Ser. No. 15/228,904 filed Aug. 4, 2016, (vi) U.S. non-provisional application Ser. No. 15/292,100 filed Oct. 12, 2016, (vii) U.S. provisional App. No. 62/443,703 filed Jan. 7, 2017, and (viii) U.S. provisional App. No. 62/443,707 filed Jan. 7, 2017. Each one of said provisional and non-provisional applications is incorporated by reference as if fully set forth herein.

Figure 1:
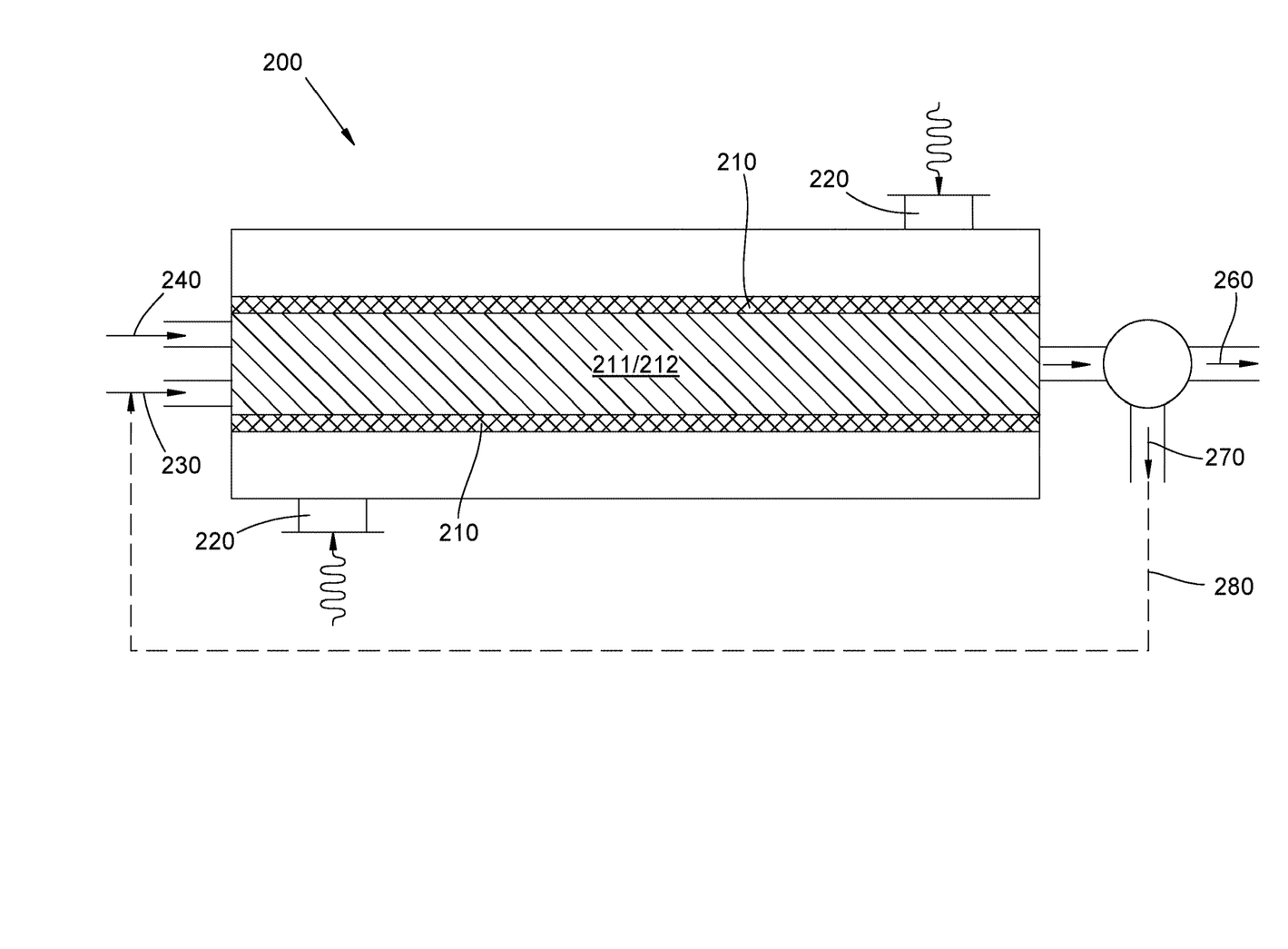
The drawing illustrates schematically microwave-assisted conversion of carbon dioxide to carbon monoxide in a reaction vessel containing solid carbonaceous material.

A method, for consuming carbon dioxide and generating carbon monoxide in a reaction vessel 200, is illustrated schematically in the drawing. A flow 230 of a dehumidified gaseous source of carbon dioxide enters the reaction vessel 200 through an input port. For purposes of the present disclosure or appended claims, "dehumidified" indicates that the gas flow thus described has a water content less than about 3% by volume, as supplied or as a result of a dehumidification process. If desired, in some examples a flow 240 of gaseous nitrogen or other inert process gas(es) enters the reaction vessel 200 through an input port. Although separate ports are shown, the carbon dioxide flow 230 and other process gas flow(s) 240 (if present) could instead be combined upstream and introduced into the reaction vessel 200 through a single port. In the remainder of this disclosure, references to carbon dioxide flow 230 shall be understood also to encompass those examples wherein the flow 240 of process gas(es) may also be present.

The reaction vessel 200 contains a dried, solid carbonaceous material 211. Any suitable carbonaceous material (e.g., one or more of coal, coke, biochar, activated carbon, black carbon, charcoal, or other suitable carbonaceous material, suitably dried or devolatilized) can be employed in any suitable physical form (e.g., a packed bed, solid or coated media of any suitable shape or form, flowing fluidized particulates, and so on). If needed or desired, the carbonaceous material can be intermixed with inert solid material for mechanical support or as a filler, or with a solid catalytic or susceptor material (discussed further below). In one example, the carbonaceous material 211 is a packed bed that includes devolatilized coal particles intermixed with magnetite particles (an oxide of iron, acting as a susceptor or catalyst) and alumina particles (an oxide of aluminum, acting as an inert, microwave-transparent filler). In another example, the carbonaceous material is continuously introduced into the reaction vessel 200 (e.g., entrained in the gas(es) or other fluid flowing into the reaction vessel 200) and flows through a packed bed 212 of magnetite (or other susceptor or catalytic material) and alumina (or other inert, microwave-transparent filler). Whatever the specific arrangement, the carbonaceous material 211 (and the susceptor or catalytic material 212, if present) in the reaction vessel 200 is irradiated with microwave energy; the resultant heating of the carbonaceous material (and susceptor or catalytic material, if present) drives an endothermic reaction of the carbon dioxide and carbon to produce carbon monoxide (e.g., according to the Boudouard reaction $C+CO_2 \rightarrow 2CO$; other reactions or pathways might occur as well). In some examples, the water content of the dried, solid carbonaceous material is less than about 3% by weight. In some examples, the dried carbonaceous material comprises devolatilized carbonaceous material, e.g., coal from which volatile materials such as aromatic hydrocarbons or other VOCs have been removed.

In some examples, the solid carbonaceous material can act as a catalyst for the endothermic, microwave-assisted reaction of carbon dioxide and carbon to produce carbon monoxide, or as a susceptor for absorbing incident microwave energy and converting it to thermal energy, or both. In some examples, the reaction vessel 200 also contains solid material 212 that includes one or more catalytic or susceptor materials (or materials of both types, or one or more materials that fulfill both functions). Any suitable susceptor or catalytic material can be employed in any suitable physical form, e.g., a packed bed, coated media of any suitable shape or form, a flowing fluidized particulate material, and so on. Examples of suitable materials include catalysts or susceptors based on, e.g., iron, cobalt, nickel, rhodium, ruthenium, platinum, palladium, or a combination of one or more susceptor or catalytic materials; a susceptor or catalytic material "based on" a given element can include one or more of the elemental form (e.g., metallic nickel), oxides (e.g., an iron oxide such as magnetite ($Fe_3O_4$)), or other compounds that include the element (e.g., an iron-containing compound such as pyrrhotite (FeS)); suitable susceptors or catalytic materials therefore can include metals, metal oxides, other metal-containing compounds, or combinations thereof. The catalytic or susceptor material can be intermixed or otherwise interspersed with the carbonaceous material (and inert, microwave-transparent material, if present) in any suitable way. The catalytic or susceptor material 212 in the reaction vessel 200 is irradiated with microwave energy along with the carbonaceous material 211, thereby heating the material 212 and helping to drive the endothermic reaction the carbon dioxide and carbon to produce the carbon monoxide (as described above). In the remainder of this disclosure, references to carbonaceous material 211 shall be understood also to encompass those examples wherein the catalytic or susceptor material 212 may also be present.

In the example shown, the reaction vessel 200 contains within its volume a quartz-lined passage 210 that contains the carbonaceous material 211. The quartz is substantially transparent to microwaves, and so acts as windows for transmitting the microwaves to irradiate the carbonaceous material 211. Any suitably strong and chemically compatible material that is substantially transparent to microwave radiation can be employed as window material or to contain the carbonaceous material 211 and the carbon dioxide 230 flowing past it or through it. Examples of suitable materials can include, but are not limited to, quartz, silica, zirconia, cordierite, boron nitride, alumina, and so forth; note that such materials are also suitable for use as an inert, microwave-transparent filler, if present. The microwaves enter the reaction vessel 200 through waveguides 220. The arrangement shown in the drawing is only one example of a suitable arrangement for the reaction vessel 200, microwave-transmitting windows or containment, microwave waveguides, and so forth; myriad other suitable arrangements of one or more microwave waveguides or transmission windows can be implemented within the scope of the present disclosure or appended claims. In some examples, there is no space between the passage 210 and the reaction vessel 200. In some other examples, there is no distinct passage 210, and the quartz or other microwave-transmitting material is present only where microwave waveguides 220 enter the reaction vessel 200, or recessed some distance into the waveguides 220. In any of these and other examples, in addition to transmitting the microwave radiation, the quartz or other window material can also act as all or part of pressure containment for the reaction vessel 200. In some examples, instead of or in addition to the waveguides 220, microwaves can be delivered into the reaction chamber using one or more cables (e.g., coaxial cables) each terminating in a corresponding antenna (e.g., a dipole antenna) arranged so as to irradiate the carbonaceous material 211.

For a given geometry of the reaction vessel 200 and the carbonaceous material 211, differing numbers or arrangements of the waveguides 220 can be employed, as well as differing relative amplitudes and phases, to obtain an optimized, or at least adequate, distribution of microwave energy within the carbonaceous material 211 in the reaction vessel 200. In the example shown, the microwave waveguides 220 are arranged on opposing sides of the reaction vessel 200 and offset from one another along a direction of flow through the reaction vessel 200. In that example arrangement, one suitable distribution of microwave energy within the reaction vessel 200 is obtained when the phases of microwave radiation entering the reaction vessel 200 through the waveguides 220 differ from each other by about a quarter of a period of the microwave radiation (i.e., a phase difference of about $\pi/2$). Other numbers and positions of waveguides 220, and corresponding relative phases of microwave energy emerging from those waveguides, can be employed. Microwave energy at any one or more frequencies, each with one or more corresponding relative phases, can be employed that results in adequate heating of the carbonaceous material 211. In some examples, the microwave energy is at (or varies between; see below) one or more frequencies between about 300 MHz and about 10 GHz, e.g., frequencies within the so-called industrial, scientific, and medical (ISM) frequency bands; in some examples, the microwave energy is at one or more frequencies, e.g., between about 500 MHz and about 3 GHz, between about 2.4 GHz and about 2.5 GHz, between about 5 GHz and about 7 GHz, between about 900 MHz and about 1000 MHz, at about 500 MHz, at about 915 MHz, or at about 896 MHz.

It has been observed that irradiating the carbonaceous material 211 using a single, fixed microwave frequency can result in uneven heating of the carbonaceous material 211. Uneven heating leads to a spatial profile of the temperature within the reaction vessel 200 that exhibits potentially large temperature variations (e.g., greater than 1000° C. peak-to-peak; in extreme instances the uneven heating can lead to localized electric discharge, electric arcing, or plasma formation, with concomitant peak-to-peak temperature variations of 2000° C., 3000° C., or even higher, often accompanied by damage to the reaction vessel 200 or the carbonaceous material 211). The reaction vessel 200, the carbonaceous material 211, or the irradiating of the carbonaceous material 211 can be arranged so as to exhibit a reduced maximum spatial variation of temperature within the reaction vessel 200 (relative to the fixed-frequency case) or so as to suppress or prevent electric arcing, electric discharge, and plasma generation within the reaction vessel 100 (in contrast to the methods disclosed in, e.g., U.S. Pat. No. 5,266,175 or U.S. Pub. No. 2015/0246337). "Suppressing" in this context means that any electric arcing, electric discharge, or plasma generation that might occur is only incidental and intermittent, and does not result in any of the undesirable side effects noted above. The suppressing or preventing of arcing, discharge, or plasma generation can be achieved in any suitable way, including one or more of the following. In some examples, simply limiting the microwave power can result in prevention or sufficient suppression (while still high enough to drive the desired catalyzed reactions). In some examples, the spatial arrangement of the waveguides 220 or the reaction vessel 200 can result in prevention or sufficient suppression. In some examples the one or more frequencies or phases of the microwave radiation can be selected to result in prevention or sufficient suppression. In some examples, use of multiple microwave frequencies, or one or more time-varying microwave frequencies, can result in prevention or sufficient suppression (e.g., as disclosed in U.S. provisional App. No. 62/249,891 filed Nov. 2, 2015 and U.S. non-provisional application Ser. No. 15/292,100 filed Oct. 12, 2016, both of which are incorporated by reference above).

The conversion of carbon dioxide in the reaction vessel 200 begins as the temperature in the reaction vessel 200 reaches about 350° C. (from heating of the carbonaceous material 211 by microwave irradiation; additional heating can be applied if need or desired). The carbon dioxide conversion rate increases to nearly 100% as the temperature increases from about 350° C. into the range of about 600° C. to about 800° C. It is therefore useful to irradiate the carbonaceous material 211 only as much as necessary to maintain a temperature between about 600° C. and about 800° C. in the reaction vessel 200; any further heating beyond about 800° C. may not improve the carbon dioxide conversion rate, but might cause excessive heating and potential damage to the carbonaceous material 211 or the reaction vessel 200. Temperatures between about 350° C. and about 600° C. (e.g., greater than about 400° C.) can also be maintained, albeit with correspondingly lower conversion rates of $CO_2$ (e.g., it may be desirable in some examples to remain below the Curie temperature of a magnetite catalyst (about 585° C.)). Note that the elevated temperature of the carbonaceous material 211 can be maintained without relying on heat produced by complete combustion of the carbonaceous material (i.e., oxidation of the carbonaceous material to carbon dioxide instead of carbon monoxide), or on heat produced by combustion of methane or other hydrocarbon fuel; such combustion would reduce the net conversion of carbon dioxide by the reaction vessel 200. In some examples, complete combustion of the carbonaceous material can be reduced or substantially prevented by reducing oxygen content of the carbon dioxide source gas 230 or the process gas(es) 240, or by controlling reaction conditions within the reaction vessel.

Pressures between about 1 atm and about 70 atm can be employed in the reaction vessel 200; in some examples pressures between about 1 atm and about 30 atm can be employed in the reaction vessel 200; in some examples pressures between about 1 atm and about 10 atm can be employed in the reaction vessel 200; in some other examples pressures between about 15 atm and about 25 atm, or at about 20 atm, can be employed; in some other examples pressures between about 35 atm and about 45 atm, or at about 40 atm, can be employed; in some other examples pressures between about 55 atm and about 65 atm, or at about 60 atm, can be employed.

Depending on the origin of the carbon dioxide source gas 230, dehumidification of the source gas 230 before introducing it into the reaction vessel 200 might be required, if the source gas 230 is not sufficiently dehumidified to begin with (i.e., less than about 3% water by volume). The carbon dioxide source gas 230 can be dehumidified by any suitable method (e.g., by condensation on cooling elements using wet or dry cooling, refrigerant cooling, thermoelectric cooling, or cryogenic cooling, or by using a dry or wet desiccant) to reduce or substantially eliminate water from the carbon dioxide source gas stream 230. Water content of the gaseous carbon dioxide source 230 is less than about 3% by volume, can be less than about 2% by volume, or can be less than about 1% by volume, and the water content of the combination of all gases entering the reaction vessel 200 is less than about 3% by volume, less than about 2% by volume, or less than about 1% by volume. Within those ranges, water content can, if needed or desired, be controlled (by dehumidification) as a process parameter for controlling or optimizing the conversion of carbon dioxide. Note that the term "dehumidified" can refer to a source gas that has undergone a dehumidification process as part of the disclosed methods, or that has a sufficiently low water content as supplied without requiring a separate dehumidification step. The degree to which the carbon dioxide source gas is dehumidified can be selected, e.g., so as to achieve optimized conversion of carbon dioxide, or to achieve an acceptable level of carbon dioxide conversion while limiting the expense or energy consumption of any needed dehumidification process.

In some examples, the carbon dioxide source gas 230 is pure, or nearly pure, carbon dioxide; in many other examples, the carbon dioxide source gas 230 is not pure carbon dioxide, but will include other gases, typically inert gases. A common component of the carbon dioxide source gas 230 is nitrogen, which in some examples can be present in the carbon dioxide source gas 230 at non-zero levels up to about 80% by volume (e.g., greater than about 60% by volume, greater than about 70% by volume, or equal to about 78% by volume). The carbon dioxide conversion rates observed above were obtained at gas flow rates that resulted in residence times of the gases in the irradiated carbonaceous material 211 on the order of 500 milliseconds or less. The main effects of the presence of nitrogen (or other inert gas) is that it decreases the effective residence times of the carbon dioxide in the carbonaceous material 211, and carries more heat away from the irradiated carbonaceous material 211. Both of those effects appear to be relatively minor, however. For example, higher microwave power can offset the heat carried away by the nitrogen flow.

The processes disclosed herein can be advantageously employed to convert carbon dioxide, which is a potent greenhouse gas, into a higher-value carbon monoxide feedstock. A mixture that includes the carbon monoxide flows out of the reaction vessel 200. At least a portion of the carbon monoxide produced (output stream 260) can be separated from the stream 270 that can include unreacted (or regenerated) carbon dioxide or other reaction byproducts. The processes disclosed herein can be operated so that less carbon dioxide leaves the reaction vessel 200 in the mixtures 260/270 than is introduced into the reaction vessel 200 in the source gas 230, so that a net decrease in atmospheric carbon dioxide occurs. To further reduce atmospheric carbon dioxide, at least a portion of carbon dioxide present in the mixture 270 can be recovered and reintroduced into the source gas stream 230 into the reaction vessel 200. If needed, that recovered carbon dioxide can be dehumidified (by any suitable method disclosed above) before its reintroduction into the source gas stream 230 into the reaction vessel 200.

Various plentiful sources of carbon dioxide can be employed to obtain the carbon dioxide source gas stream 230, including but not limited to combustion exhaust, biomass digestion (e.g., in the course of ethanol production), chemical processing byproducts (e.g., from hydrogen generation, production of lime or cement, ethylene production, or ammonia production), smelting or other mineral or ore processing, or any other natural or anthropogenic source of carbon dioxide. Some examples in which the carbon dioxide source gas stream 230 comprises combustion exhaust include flue gas produced by, e.g., an electrical generation facility (e.g., gas- or coal-fired) or a steam generation facility. Flue gas typically comprises about 60% or more (by volume) of nitrogen, about 10% or more (by volume) of carbon dioxide, and about 10% or more (by volume) of water vapor, with the remainder being oxygen and various trace gases (e.g., $SO_2$, $SO_3$, HCl, and so forth). Before introducing the flue gas into the reaction vessel 200 as the carbon dioxide source gas 230, it is dehumidified by any suitable process. In addition, if needed or desired, oxygen content of the flue gas can be reduced by any suitable process.

In addition to the preceding, the following examples fall within the scope of the present disclosure or appended claims:

Example 1

A method for generating carbon monoxide, the method comprising: (a) introducing a flow of a dehumidified gaseous source of carbon dioxide into a reaction vessel; (b) irradiating a mixture of dried, solid carbonaceous material in the reaction vessel with microwave energy so as to heat the solid carbonaceous material and drive an endothermic reaction of the carbon dioxide and carbon that produces carbon monoxide, wherein at least a portion of heat required to maintain a temperature within the reaction vessel is supplied by the microwave energy irradiating the carbonaceous material in the reaction vessel; and (c) allowing a mixture that includes the carbon monoxide to flow out of the reaction vessel.

Example 2

The method of Example 1 wherein the dried carbonaceous material comprises devolatilized carbonaceous material.

Example 3

The method of any one of Examples 1 or 2 wherein the dried carbonaceous material comprises one or more of coal, coke, biochar, black carbon, charcoal, or activated carbon.

Example 4

The method of any one of Examples 1 through 3 wherein the water content of the solid carbonaceous material is less than about 3% by weight.

Example 5

The method of any one of Examples 1 through 4 wherein (i) solid susceptor or catalytic material is mixed with the solid carbonaceous material, and (ii) the method further comprises irradiating the solid susceptor or catalytic material along with the carbonaceous material.

Example 6

The method of Example 5 wherein the susceptor or catalytic material includes one or more materials based on one or more of iron, cobalt, nickel, rhodium, ruthenium, platinum, palladium, other one or more suitable susceptor or catalytic materials, or combinations thereof.

Example 7

The method of any one of Examples 5 or 6 wherein the susceptor or catalytic material includes magnetite.

Example 8

The method of any one of Examples 1 through 7 further comprising dehumidifying the gaseous source of carbon dioxide before introduction into the reaction vessel.

Example 9

The method of any one of Examples 1 through 8 wherein the water content of the gaseous source of carbon dioxide is (i) less than about 2% by volume or (ii) less than about 1% by volume.

Example 10

The method of any one of Examples 1 through 9 wherein the gaseous source of carbon dioxide includes a non-zero amount of nitrogen (i) up to about 80% nitrogen by volume, (ii) greater than about 60% nitrogen by volume, (iii) greater than about 70% nitrogen by volume, or (iv) about equal to 78% nitrogen by volume.

Example 11

The method of any one of Examples 1 through 10 wherein water content of a combination of all gases entering the reaction vessel is (i) less than about 3% by volume, (ii) less than about 2% by volume, or (iii) less than about 1% by volume.

Example 12

The method of any one of Examples 1 through 11 further comprising separating at least a portion of the carbon monoxide from a mixture that leaves the reaction vessel.

Example 13

The method of any one of Examples 1 through 12 wherein less carbon dioxide leaves the reaction vessel with the carbon monoxide than is introduced into the reaction vessel.

Example 14

The method of any one of Examples 1 through 13 further comprising recovering at least a portion of carbon dioxide that leaves the reaction vessel with the carbon monoxide, and reintroducing the recovered carbon dioxide into the reaction vessel.

Example 15

The method of Example 14 further comprising dehumidifying the recovered carbon dioxide before reintroduction into the reaction vessel.

Example 16

The method of any one of Examples 1 through 15 further comprising maintaining the reaction vessel at a temperature (i) between about 350° C. and about 600° C., (ii) above about 400° C., or (iii) between about 600° C. and about 800° C.

Example 17

The method of any one of Examples 1 through 16 wherein temperature within the reaction vessel is maintained without relying on heat produced by combustion of the carbonaceous material or by combustion of methane or other hydrocarbon fuel.

Example 18

The method of any one of Examples 1 through 17 further comprising reducing or substantially preventing complete combustion of the carbonaceous material by reducing oxygen content of a combination of all gases entering the reaction vessel, or by controlling reaction conditions within the reaction vessel.

Example 19

The method of any one of Examples 1 through 18 wherein the gaseous source of carbon dioxide comprises combustion exhaust.

Example 20

The method of Example 19 further comprising dehumidifying the combustion exhaust before introducing the combustion exhaust into the reaction vessel.

Example 21

The method of any one of Examples 19 or 20 wherein the combustion exhaust comprises flue gas from an electrical or steam generation facility.

Example 22

The method of any one of Examples 1 through 21 wherein the reaction vessel includes one or more windows comprising one or more materials that transmit the microwave energy, and the microwave energy irradiating the carbonaceous material in the reaction vessel passes through the one or more windows.

Example 23

The method of any one of Examples 1 through 22 wherein the reaction vessel includes one or more of quartz, silica, zirconia, cordierite, boron nitride, alumina, or other suitable microwave-transparent material.

Example 24

The method of any one of Examples 1 through 23 wherein the microwave energy is introduced into the reaction vessel through two or more microwave waveguides or antennas arranged along or around the reaction vessel, and a corresponding portion of the microwave radiation entering the reaction vessel through each waveguide or antenna is characterized by a corresponding phase that differs from a corresponding phase of a corresponding portion of the microwave radiation entering at least one other of the waveguides or antennas.

Example 25

The method of any one of Examples 1 through 24 wherein the microwave energy is introduced into the reaction vessel through a pair of microwave waveguides or antennas, the microwave waveguides or antennas are arranged on opposing sides of the reaction vessel and offset from one another along a direction of flow through the reaction vessel, and phases of microwave radiation entering the reaction vessel from the waveguides or antennas differ from each other by about a quarter of a period of the microwave radiation.

Example 26

The method of any one of Examples 1 through 25 wherein the microwave energy is characterized by two or more different frequencies simultaneously so as to result in a maximum spatial variation of temperature within the reaction vessel that is less than a maximum spatial variation of temperature resulting from irradiating the carbonaceous material with microwave radiation at a single, fixed frequency.

Example 27

The method of any one of Examples 1 through 26 wherein a frequency of the microwave radiation varies with time so as to result in a maximum spatial variation of temperature within the reaction vessel that is less than a maximum spatial variation of temperature resulting from irradiating the carbonaceous material with microwave radiation at a single, fixed frequency.

Example 28

The method of any one of Examples 1 through 27 wherein the microwave energy is at, or varies between, one or more frequencies: (i) between about 300 MHz and about 10 GHz; (ii) within the so-called industrial, scientific, and medical (ISM) radio bands; (iii) between about 500 MHz and about 3 GHz; (iv) between about 2.4 GHz and about 2.5 GHz; (v) between about 5 GHz and about 7 GHz; (vi) between about 900 MHz and about 1000 MHz; (vii) at about 500 MHz; (viii) at about 915 MHz; or (ix) at about 896 MHz.

Example 29

The method of any one of Examples 1 through 28 wherein the reaction vessel, the carbonaceous material, or the irradiating of the carbonaceous material is arranged so as to suppress electric arcing, electric discharge, and plasma generation within the reaction vessel.

Example 30

The method of any one of Examples 1 through 29 wherein the reaction vessel, the carbonaceous material, or the irradiating of the carbonaceous material is arranged so as to prevent electric arcing, electric discharge, and plasma generation within the reaction vessel.

It is intended that equivalents of the disclosed example embodiments and methods shall fall within the scope of the present disclosure or appended claims. It is intended that the disclosed example embodiments and methods, and equivalents thereof, may be modified while remaining within the scope of the present disclosure or appended claims.

In the foregoing Detailed Description, various features may be grouped together in several example embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed example embodiment. Thus, the appended claims are hereby incorporated into the Detailed Description, with each claim standing on its own as a separate disclosed embodiment. However, the present disclosure shall also be construed as implicitly disclosing any embodiment having any suitable set of one or more disclosed or claimed features (i.e., a set of features that are neither incompatible nor mutually exclusive) that appear in the present disclosure or the appended claims, including those sets that may not be explicitly disclosed herein. In addition, for purposes of disclosure, each of the appended dependent claims shall be construed as if written in multiple dependent form and dependent upon all preceding claims with which it is not inconsistent. It should be further noted that the scope of the appended claims does not necessarily encompass the whole of the subject matter disclosed herein.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure and appended claims, the words "comprising," "including," "having," and variants thereof, wherever they appear, shall be construed as open ended terminology, with the same meaning as if the phrase "at least" were appended after each instance thereof, unless explicitly stated otherwise. For purposes of the present disclosure or appended claims, when terms are employed such as "about equal to," "substantially equal to," "greater than about," "less than about," and so forth, in relation to a numerical quantity, standard conventions pertaining to measurement precision and significant digits shall apply, unless a differing interpretation is explicitly set forth. For null quantities described by phrases such as "substantially prevented," "substantially absent," "substantially eliminated," "about equal to zero," "negligible," and so forth, each such phrase shall denote the case wherein the quantity in question has been reduced or diminished to such an extent that, for practical purposes in the context of the intended operation or use of the disclosed or claimed apparatus or method, the overall behavior or performance of the apparatus or method does not differ from that which would have occurred had the null quantity in fact been completely removed, exactly equal to zero, or otherwise exactly nulled.

For purposes of the present disclosure and appended claims, any labelling of elements, steps, limitations, or other portions of an example or claim (e.g., (a), (b), (c), etc., or (i), (ii), (iii), etc.) is only for purposes of clarity, and shall not be construed as implying any sort of ordering or precedence of the portions so labelled. If any such ordering or precedence is intended, it will be explicitly recited in the example or claim or, in some instances, it will be implicit or inherent based on the specific content of the example or claim. In the appended claims, if the provisions of 35 USC § 112(f) are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC § 112(f) are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. A method for generating carbon monoxide, the method comprising:
   (a) introducing a flow of a dehumidified gaseous source of carbon dioxide into a reaction vessel;
   (b) irradiating dried, solid carbonaceous material in the reaction vessel with microwave energy so as to heat the solid carbonaceous material and drive an endothermic reaction of the carbon dioxide and carbon that produces carbon monoxide, wherein at least a portion of heat required to maintain a temperature within the reaction vessel is supplied by the microwave energy irradiating the carbonaceous material in the reaction vessel; and
   (c) allowing the generated carbon monoxide to flow out of the reaction vessel,
   wherein:
   (d) the microwave energy is introduced into the reaction vessel through two or more microwave waveguides or antennas arranged along or around the reaction vessel, and a corresponding portion of the microwave radiation entering the reaction vessel through each waveguide or antenna is characterized by a corresponding phase that differs from a corresponding phase of a corresponding portion of the microwave radiation entering at least one other of the waveguides or antennas;
   (e) the microwave energy is characterized by two or more different frequencies simultaneously so as to result in a maximum spatial variation of temperature within the reaction vessel that is less than a maximum spatial variation of temperature resulting from irradiating the carbonaceous material with microwave radiation at a single, fixed frequency; or
   (f) during the endothermic reaction of the carbon dioxide and carbon that produces carbon monoxide, a frequency of the microwave radiation varies with time so as to result in a maximum spatial variation of temperature within the reaction vessel that is less than a maximum spatial variation of temperature resulting from irradiating the carbonaceous material with microwave radiation at a single, fixed frequency.

2. The method of claim 1 wherein the dried carbonaceous material comprises devolatilized carbonaceous material.

3. The method of claim 1 wherein the dried carbonaceous material comprises one or more of coal, coke, biochar, black carbon, charcoal, or activated carbon.

4. The method of claim 1 wherein water content of the solid carbonaceous material is less than about 3% by weight.

5. The method of claim 1 wherein (i) solid susceptor or catalytic material is mixed with the solid carbonaceous material, and (ii) the method further comprises irradiating the solid susceptor or catalytic material along with the carbonaceous material.

6. The method of claim 5 wherein the susceptor or catalytic material includes magnetite.

7. The method of claim 1 further comprising dehumidifying the gaseous source of carbon dioxide before introduction into the reaction vessel.

8. The method of claim 1 wherein water content of the gaseous source of carbon dioxide is less than about 2% by volume.

9. The method of claim 1 wherein the gaseous source of carbon dioxide includes a non-zero amount of nitrogen up to about 80% nitrogen by volume.

10. The method of claim 1 wherein water content of a combination of all gases entering the reaction vessel is less than about 3% by volume.

11. The method of claim 1 further comprising separating at least a portion of the generated carbon monoxide from a mixture that flows out of the reaction vessel.

12. The method of claim 1 wherein less carbon dioxide leaves the reaction vessel with the carbon monoxide than is introduced into the reaction vessel.

13. The method of claim 1 further comprising recovering at least a portion of carbon dioxide that leaves the reaction vessel with the carbon monoxide, and reintroducing the recovered carbon dioxide into the reaction vessel.

14. The method of claim 13 further comprising dehumidifying the recovered carbon dioxide before reintroduction into the reaction vessel.

15. The method of claim 1 further comprising maintaining the reaction vessel at a temperature above about 400° C.

16. The method of claim 1 further comprising maintaining the reaction vessel at a temperature between about 600° C. about 800° C.

17. The method of claim 1 wherein temperature within the reaction vessel is maintained without relying on heat produced by combustion of the carbonaceous material or by combustion of methane or other hydrocarbon fuel.

18. The method of claim 1 further comprising reducing or substantially preventing complete combustion of the carbonaceous material by reducing oxygen content of a combination of all gases entering the reaction vessel, or by controlling reaction conditions within the reaction vessel.

19. The method of claim 1 wherein the gaseous source of carbon dioxide comprises combustion exhaust.

20. The method of claim 19 further comprising dehumidifying the combustion exhaust before introducing the combustion exhaust into the reaction vessel.

21. The method of claim 19 wherein the combustion exhaust comprises flue gas from an electrical or steam generation facility.

22. The method of claim 1 wherein the reaction vessel includes one or more windows comprising one or more materials that transmit the microwave energy, and the microwave energy irradiating the carbonaceous material in the reaction vessel passes through the one or more windows.

23. The method of claim 1 wherein the microwave energy is introduced into the reaction vessel through two or more microwave waveguides or antennas arranged along or around the reaction vessel, and a corresponding portion of the microwave radiation entering the reaction vessel through each waveguide or antenna is characterized by a corresponding phase that differs from a corresponding phase of a corresponding portion of the microwave radiation entering at least one other of the waveguides or antennas.

24. The method of claim 1 wherein the microwave energy is characterized by two or more different frequencies simultaneously so as to result in a maximum spatial variation of temperature within the reaction vessel that is less than a maximum spatial variation of temperature resulting from irradiating the carbonaceous material with microwave radiation at a single, fixed frequency.

25. The method of claim 1 wherein, during the endothermic reaction of the carbon dioxide and carbon that produces carbon monoxide, a frequency of the microwave radiation varies with time so as to result in a maximum spatial variation of temperature within the reaction vessel that is less than a maximum spatial variation of temperature resulting from irradiating the carbonaceous material with microwave radiation at a single, fixed frequency.

26. The method of claim 1 wherein the reaction vessel, the carbonaceous material, or the irradiating of the carbonaceous material is arranged so as to suppress electric arcing, electric discharge, and plasma generation within the reaction vessel.

27. The method of claim 1 wherein the reaction vessel, the carbonaceous material, or the irradiating of the carbonaceous material is arranged so as to prevent electric arcing, electric discharge, and plasma generation within the reaction vessel.

* * * * *